Jan. 9, 1923.

J. A. SCOTT.
BREAD CUTTER.
FILED AUG. 28, 1922.

1,441,887.

Inventor
John A. Scott

By Herbert E. Smith
Attorney

Patented Jan. 9, 1923.

1,441,887

UNITED STATES PATENT OFFICE.

JOHN A. SCOTT, OF SPOKANE, WASHINGTON.

BREAD CUTTER.

Application filed August 28, 1922. Serial No. 584,758.

*To all whom it may concern:*

Be it known that I, JOHN A. SCOTT, a citizen of the United States, residing at Spokane, in Spokane County and State of Washington, have invented certain new and useful Improvements in Bread Cutters, of which the following is a specification.

My present invention relates to improvements in bread cutters or similar devices in which provision is also made for converting the device for use as a meat cutting implement, whereby the device may be used alternately for slicing bread or slicing meat as desired.

The primary object of the invention is the provision of a device of this character which is simple in construction, comparatively inexpensive in manufacture, and which may with facility be utilized for a bread cutting utensil and with equal facility be converted for use in slicing or cutting meats.

To this end the invention consists in certain novel combinations and arrangements of parts as will be hereinafter more fully described and claimed.

In the accompanying drawings I have illustrated one complete example of the physical embodiment of my invention wherein the parts are combined and arranged according to the best mode I have thus far devised for the practical application of the principles of my invention.

Figure 1:
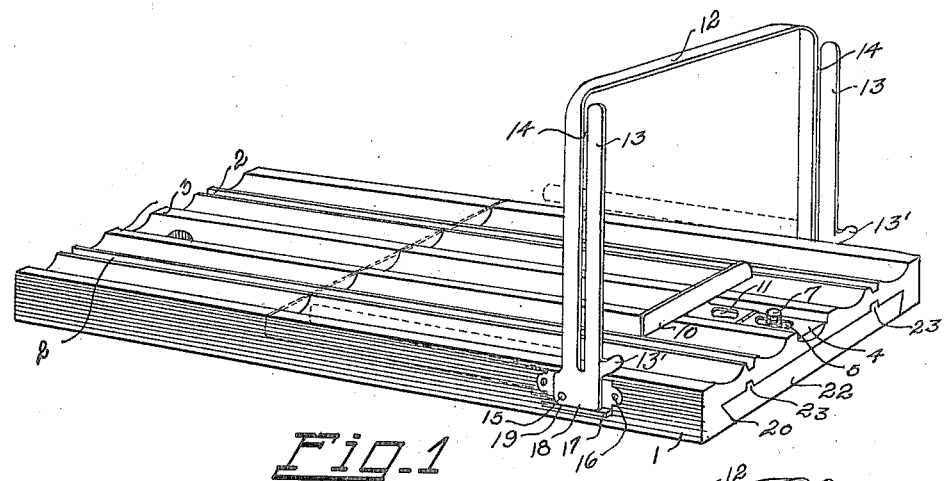
Figure 1 is a perspective view of the device ready for use in slicing bread.

In the preferred form of the invention as shown in the drawings I utilize a base board 1, preferably of hard wood, rectangular in shape, and of the proper size. On its upper surface said board may be corrugated as shown, and is fashioned with a pair of spaced, longitudinally extending guide grooves 2, 2 of suitable depth, and also with a series of spaced parallel ribs 3. The surface thus formed is well adapted to receive and retain a loaf of bread when the latter is held thereon by hand, in usual manner.

At the front end of the board 1 is located a slice gage, which includes a metalic attaching plate 4 secured in suitable manner to the board 1 and provided with a longitudinally extending slot 5 for the accommodation of the set screw 6. The set screw or clamp screw 6 is threaded into a complementary opening or aperture in the board 1, and passes through the slot 5 of the attaching plate 4. A double head 7 on the screw affords a hand or finger-hold and also provides a bearing for the screw against the slotted atachment plate, and it will be apparent that the attaching plate may be moved relatively to the board within the bounds of the slot 5 and secured in adjusted position by means of the clamp screw and its head 7.

A gage plate 8 is hinged at 9 to the attaching plate and is adapted to be swung on its hinge longitudinally of the board. At its free end the gage plate is fashioned with a flange 10 extending transversely of the board 1, and intermediate the flange and hinge a slot 11 is provided in the gage plate, which, when the plate is folded over as in Figure 2, fits over the head 7 of the clamp screw 6, to permit compact arrangement of the gage plate and attaching plate.

Whether the device is used as a bread cutter or meat cutter, a knife guide is employed for guiding the blade of the knife during the cutting or slicing operation. This knife guide comprises an inverted U-shaped or arched member 12 having at the sides of its vertical legs a pair of upright guide tongues 13, which at their bases are fashioned with finger lugs 13′. Guide slots 14 for the knife blade are thus provided between the arch and the pair of tongues, and these slots, which are open at the top are designed to receive the knife blade or other utensils used in cutting or slicing and guide the tool as the cut is made.

Thus in Figure 1 a loaf of bread may be placed on the base board 1 with its forward end against the adjusted gage, and a slice of bread of a thickness equal to the distance between the flange and a line connecting the two slots 14 of the knife guide, may be sliced or cut. The thickness of the cut slice may be governed by adjusting the attaching plate of the gage on the base board as described.

When not in use, or when not desired for use the knife guide may be turned down with its legs parallel with the base board, as shown in dotted lines in Figure 1. To this end the knife guide is hinged at 15 at the outer sides of the board by means of pivots as shown. The pivots 15 are used as connections to the pivot plates 16, one attached at each side of the base board, and each plate is provided with a horizontally extending bottom flange 17 against which the squared end 18 of the arch or yoke of the knife guide rests or bears when the yoke is in upright position as in Figures 1 and 2. At 19 adjacent the pivot 15, the corner of the yoke is rounded, and the flanges 17 may be somewhat resilient to permit the yoke to be readily turned down to the dotted position in Figure 1.

At the underside of the base board 1 a longitudinally extending groove is cut having dove tail or undercut walls 20 and within the limits of the groove the bottom face of the board is grooved as at 21, these grooves being spaced apart similar to the grooves 2 on the upper face of the board and located directly beneath these grooves 2.

The meat board 22, with its beveled edges or sides 22' and longitudinal guide ribs 23 is adapted to be housed within the grooved base board when the former is not in use. Thus in Figure 1 the meat board is shown as being slid into its groove in the bottom face of the base board with the ribs 23 in the complementary grooves 21.

Figure 2:
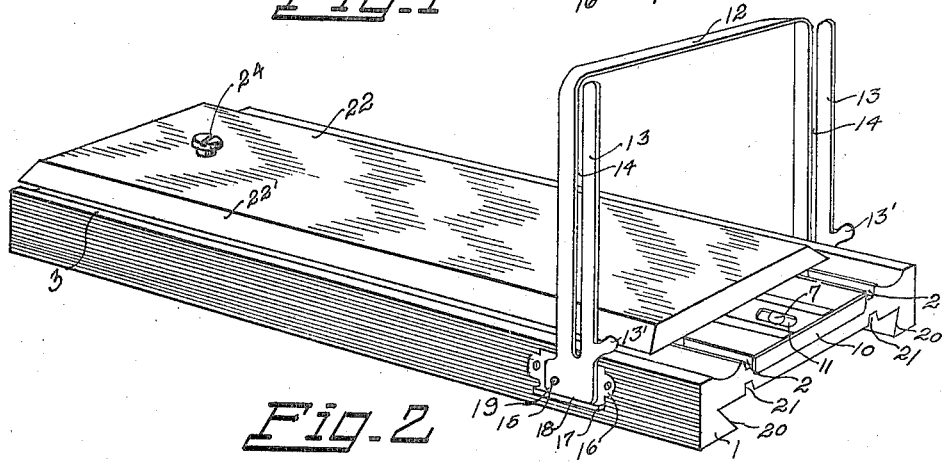
Figure 2 is a perspective view of the device converted for use and ready for cutting meats.
Figure 3:
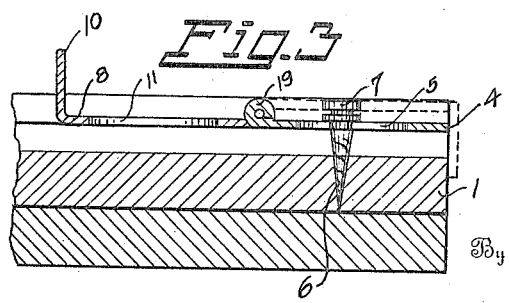
Figure 3 is an enlarged, detail, sectional view showing the slice gage together with the bread board and the meat board in position.

When used for cutting meat the meat board is withdrawn from its groove or pocket in the bottom of the base board, and after the slice-gage has been disposed of by folding the gage plate on its hinge 9 to the position of Figure 2 and as shown in dotted lines in Figure 3, the meat board is placed on top of the base board or bread board, as in Figure 2. By means of a set screw 24 passing through an aperture in the meat board and threaded into an opening in the bread board, the meat board is arranged and fixed in proper position for use, as in Figure 2. When used for cutting or slicing meat, the knife guide or yoke is utilized for guiding the knife in the same manner that bread is cut or sliced from a loaf in order to secure the desired thickness and uniformity of thickness in the slice or cut of meat.

From the above description taken in connection with my drawings it will be apparent that the device may with facility be adapted for use in cutting either bread or meat, and when used for either purpose the cutting knife may be manipulated conveniently and the slicing or cutting may proceed with dispatch for the production of uniform slices. Adjustments may readily be made in the gage for securing different thicknesses of bread, and the interchangeable parts may be quickly adapted for the purpose required.

Having thus fully described my invention, what I claim as new and desire to secure by Letters Patent is:

1. The combination in a device as described with a base board, of a knife guide comprising a yoke formed with complementary tongues to provide guide slots, pivot plates secured to the board having flanges, pivotal joints between the guide and said plates, and said yoke having squared ends adapted to engage said flanges.

2. The combination with a cutting board having pivot plates attached at its sides, and horizontally extending flanges on said plates, of a knife guide comprising an inverted U-shaped yoke having its ends pivoted on said plates, said U-shaped yoke terminating in squared ends adapted to co-act with said flanges.

3. The combination with a cutting board having a knife guide, of a slice gage comprising a slotted attaching plate and clamp screw for securing said plate in adjusted position on the board, a gage plate hinged to said attaching plate, and a gaging-flange on said gage plate adapted to be folded over the edge of the cutting board.

4. The combination with a base board having spaced grooves in its upper and lower surfaces and formed with a bottom groove having undercut walls, of a cutting board having beveled edges and spaced longitudinal ribs adapted to slide into said bottom groove, said ribs adapted to engage in the spaced grooves on the upper surface of the base board, and means for securing the cutting board on top of said base board.

In testimony whereof I affix my signature.

JOHN A. SCOTT.